United States Patent

Hohler et al.

Patent Number: 5,609,093
Date of Patent: Mar. 11, 1997

[54] PASTA COOKER

[75] Inventors: Melissa M. Hohler, Kettering; Fermin Heras, Dayton, both of Ohio

[73] Assignee: Hobart Corporation, Troy, Ohio

[21] Appl. No.: 494,038

[22] Filed: Jun. 26, 1995

Related U.S. Application Data

[63] Continuation of Ser. No. 141,117, Oct. 21, 1993, abandoned.

[51] Int. Cl.$^6$ .................................................. A47J 27/00
[52] U.S. Cl. .................................................. 99/408; 99/330
[58] Field of Search ........................... 99/330, 403, 408; 210/153, 435, 447, 452, 454

[56] References Cited

U.S. PATENT DOCUMENTS

| | | | |
|---|---|---|---|
| 527,400 | 10/1894 | Barth . | |
| 677,773 | 7/1901 | Burbridge . | |
| 2,287,396 | 6/1942 | Roth . | |
| 2,978,975 | 4/1961 | Rossi | 99/330 |
| 3,107,601 | 10/1963 | Longmire | 99/330 |
| 3,363,541 | 1/1968 | Anetsberger . | |
| 3,685,433 | 8/1972 | Cunningham | 99/408 |
| 3,735,693 | 5/1973 | Pelster et al. . | |
| 3,785,970 | 1/1974 | Hodgkins . | |
| 3,839,951 | 10/1974 | Palmason | 99/330 |
| 4,084,492 | 4/1978 | Sullivan | 99/330 |
| 4,420,006 | 12/1983 | Moore et al. | 134/167 |
| 4,495,072 | 1/1985 | Fields . | |
| 4,574,688 | 3/1986 | Barbieri | 99/330 |
| 4,580,549 | 4/1986 | Sato . | |
| 4,597,325 | 7/1986 | Cardullo et al. | 99/404 |
| 4,623,544 | 11/1986 | Highnote | 426/233 |
| 5,096,729 | 3/1992 | Larsen | 426/509 |
| 5,184,539 | 2/1993 | Oiwa | 99/408 |
| 5,247,876 | 9/1993 | Wilson et al. | 99/408 |
| 5,313,876 | 5/1994 | Hilger et al. . | |

FOREIGN PATENT DOCUMENTS

| | | |
|---|---|---|
| 0159750 | 10/1985 | European Pat. Off. . |
| 2400347 | 7/1978 | France . |
| 2596250 | 3/1986 | France . |
| 661582 | 2/1950 | United Kingdom . |
| 668613 | 3/1952 | United Kingdom . |
| 9222236 | 12/1992 | WIPO . |

*Primary Examiner*—David Scherbel
*Assistant Examiner*—Randall E. Chin
*Attorney, Agent, or Firm*—Thompson Hine & Flory LLP

[57] ABSTRACT

A pasta cooker which includes an open water tank shaped to receive pasta for cooking, a heater for boiling water in the tank, a trough positioned to receive and collect starch foam from an upper surface of the water in tank, and a drain for draining water from the trough and tank, the drain including a screen box for filtering pasta particles and starch foam from drained water to prevent clogging of drains downstream of the screen box. The trough is coextensive with a front upper edge of the water tank, and the cooker includes a water fill valve which is actuatable to fill the tank such that a small amount of water continuously washes over from the tank into the trough during the cooking of pasta, thereby conveying starch foam floating on the upper surface of the water of the tank to the trough. The screen box includes a removable drawer having perforated sides and positioned to receive the water and starch foam drained from the trough and tank. The drawer is positioned within a housing shaped to collect water flowing through the drawer, and to receive water which overflows from the drawer in the event that the drawer becomes completely clogged. The screen box includes a downwardly and rearwardly sloping floor to direct drained water toward a rear opening connected to a conventional drain pipe. The pasta cooker preferably includes a second tank, also draining into a screen box, for washing cooked pasta. The second tank also includes a flexible spray nozzle for cleaning both tanks and washing cooked pasta.

15 Claims, 3 Drawing Sheets

PASTA COOKER

This is a continuation of application Ser. No. 08/141,117, filed Oct. 21, 1993 now abandoned.

BACKGROUND OF THE INVENTION

The present invention relates to cooking devices, and more particularly, devices designed for boiling pasta in a commercial environment.

Traditionally, the commercial preparation of pasta involved the boiling of pasta in large pots on a gas stove, or alternately, the boiling of pasta in large pans on a gas stove, the pans including apparatus for tilting the pan to pour out its contents. However, with the advent of high-volume commercial food establishments which serve pasta, there is need for devices which are designed exclusively for boiling pasta on a continuous and high-volume basis.

An initial attempt at developing such a device consisted of the conversion of a deep fat fryer. With that device, the tank for holding cooking oil was converted into a water holding tank, and pasta was placed in baskets positioned within the tank and cooked while the water in the tank was boiled.

Such converted devices possess inherent disadvantages. For example, as a result of the continuous cooking of pasta, the water in the tank quickly became clogged with starch foam, making it difficult to observe the cooking of the pasta, and increasing the amount of time required for cleaning. Further, the tank drains tended to become clogged easily with starch foam and pasta particles, which become extremely sticky when deposited on metal surfaces, such as the stainless steel of the drain openings.

Accordingly, there is a need for a pasta cooker which is capable of preparing pasta on a high-volume basis in which the problems of starch foam and drain clogging are minimized.

SUMMARY OF THE INVENTION

The present invention is a pasta cooker having an open water tank having a heating mechanism and shaped to receive a basket of pasta to be cooked, a trough positioned adjacent to the upper edge of the tank, and a screen box connected to the trough and tank drains. The trough preferably is coextensive with the upper edge of the front wall of the tank and, during cooking of the pasta, the water level is adjusted such that a small amount of water from the upper surface of the tank washes over from the tank into the trough, carrying with it the starch foam which is generated by the cooking of pasta. Accordingly, during the continuous cooking of pasta, the starch foam is on the surface of the water in the tank. The starch foam is continuously removed from the tank and is collected in the trough.

The trough and tank each include a drain which is connected to the screen box, so that the water and starch foam collecting in the trough is drained immediately to the screen box, which is connected to a conventional plumbing drain. The screen box includes a removable drawer having perforated side, bottom, and rear walls, which are positioned within the box to receive the drain water from the trough and the tank. The screen box drawer collects the pasta particles and starch foam entrained in the drain water, thereby removing it from the effluent from the trough. Consequently, pasta particles and starch foam are removed from all effluent from the pasta cooker.

In a preferred embodiment, the screen box includes a bottom floor which slopes downwardly and rearwardly to a rearward opening which is connected to a conventional drain. The drawer is positioned within the screen box housing such that, in the event that the drawer becomes completely clogged with pasta, the water overflowing the drawer simply flows downwardly to the sloping bottom wall and rearwardly to the drain, thereby minimizing the likelihood of water overflowing from the screen box.

Also, in a preferred embodiment, the tank for boiling pasta is ganged with a second tank which lacks a heating mechanism and is used for chilling and washing the cooked pasta. The second tank also includes a screen box, which receives water drained from the second tank. The second tank also includes a spray nozzle on a flexible hose which is used to spray cold water on the cooked pasta, as well as for cleaning both the cooking tank and the washing tank after cooling.

Accordingly, it is an object of the present invention to provide a pasta cooker having a trough for the continuous removal of starch foam from the tank during pasta cooking; a pasta cooker having a filter mechanism such that all effluent water from cooking is strained to remove starch foam and pasta particles to minimize the likelihood of drain clogging; a pasta cooker which is capable of high-volume continuous pasta cooking; a pasta cooker which is relatively easy to maintain; a pasta cooker in which all of the major controls for the cooker components are readily accessible to an operator; and a pasta cooker which is rugged and requires a minimal amount of maintenance.

Other objects and advantages will be apparent from the following description, the accompanying drawings and the appended claims.

DETAILED DESCRIPTION

Figure 1:
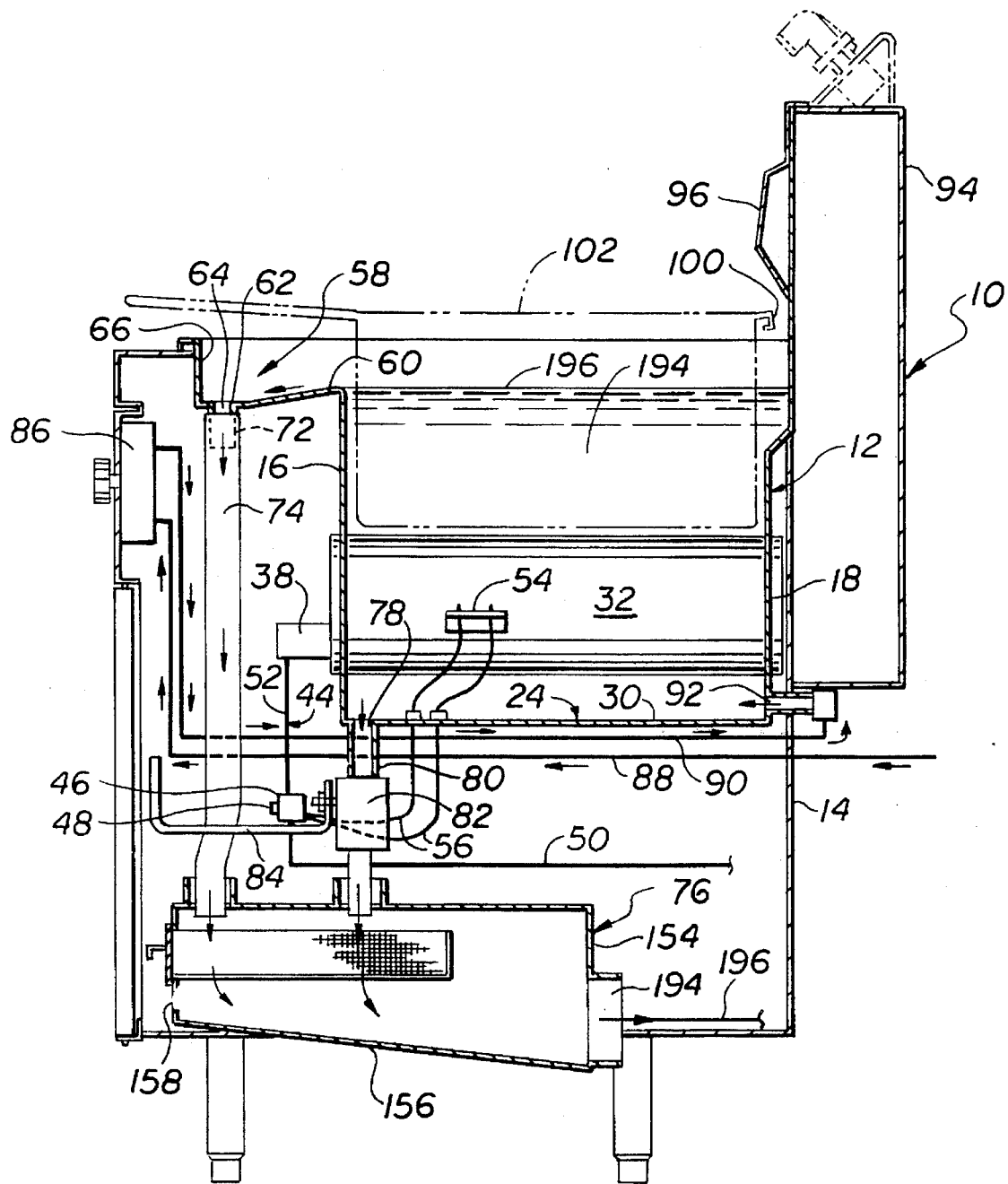
FIG. 1 is a somewhat schematic, side elevation in section of a preferred embodiment of the present invention, taken at line 1—1 of FIG. 3.

As shown in FIG. 1, the preferred embodiment of the pasta cooker of the present invention, generally designated 10, includes an open tank 12 which is supported within a cabinet 14. The tank 12 includes a front wall 16, a rear wall 18 and side walls 20, 22 (see FIG. 2). The tank 12 includes a bottom wall 24 having downwardly converging surfaces 26, 28 which are connected by a flat surface 30.

Heat tubes 32, 34, 36, each having an elliptical cross section, extend between the front wall 16 and rear wall 18, and receive burner castings 38, 40, 42 of a conventional atmospheric gas burner system 44. The gas burner system 44 includes a gas valve 46 which is manually adjustable by knob 48 and directs gas from feed line 50 to supply lines 52 which are connected to the burner castings 38–42. A thermostatic sensor 54 is mounted within the tank 12 on tube 32 and is connected to valve 46 by wires 56. The thermostatic sensor 54 includes a high limit shut off which closes the valve 46 when the temperature within the tank reaches 225° F., which would indicate that the tank 12 has boiled dry. The sensor 54 also includes a component which detects temperatures for set points corresponding to: boil and simmer. Consequently, it is not necessary for an operator to adjust a gas valve constantly during cooking to maintain a particular temperature.

Figure 2:
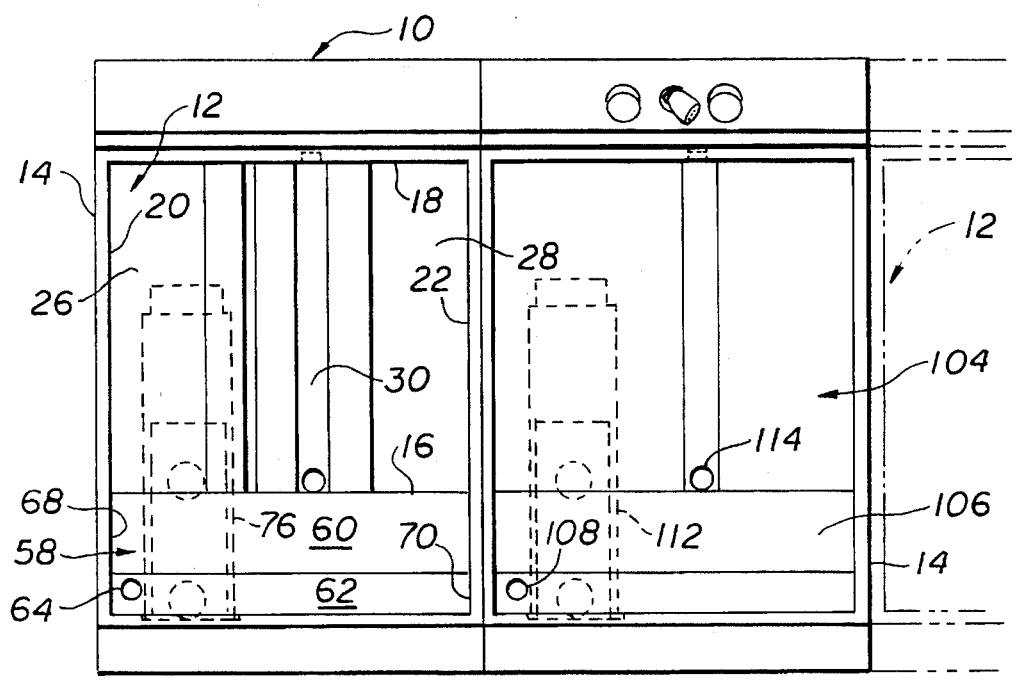
FIG. 2 is a top plan view of the pasta cooker shown in FIG. 1.

A trough 58 is positioned adjacent to the tank 12, and, as shown FIG. 2, is coextensive with the front wall 16. The trough 58 includes a forwardly and downwardly sloping bottom wall 60, a flat base wall 62 which includes a drain opening 64, a front wall 66 and opposing side walls 68, 70. The drain opening 64 is connected to a stub tube 72, which, in turn, is connected to a flexible high temperature hose 74. Hose 74 is connected at a lower end to a screen box, generally designated 76.

The tank 12 also includes a drain opening 78 which is formed in the flat surface 30 of the bottom wall 24 and is connected to a drain tube, generally designated 80. Drain tube 80 includes a drain valve 82 which is actuated by a handle 84 that extends forwardly to the front of the cabinet, so that it may be actuated by an operator of the cooker 10. Drain tube 80 also is connected to drain into screen box 76.

The cabinet 14 supports a fill valve 86 which is connected to hot water feed line 88 and supplies hot water to the tank 12 by a hot water fill line 90. Hot water fill line 90 is connected to a fill opening 92 located at the bottom of the rear wall 18.

The rear of the cabinet 14 includes a support stand 94 having a transverse channel 96 with an opening 98 shaped to receive the tongue 100 of an open mesh pasta basket 102. Accordingly, the pasta basket 102 may be suspended from the support stand 94 above the tank 12 by inserting the tongue 100 into the opening 98.

Figure 3:
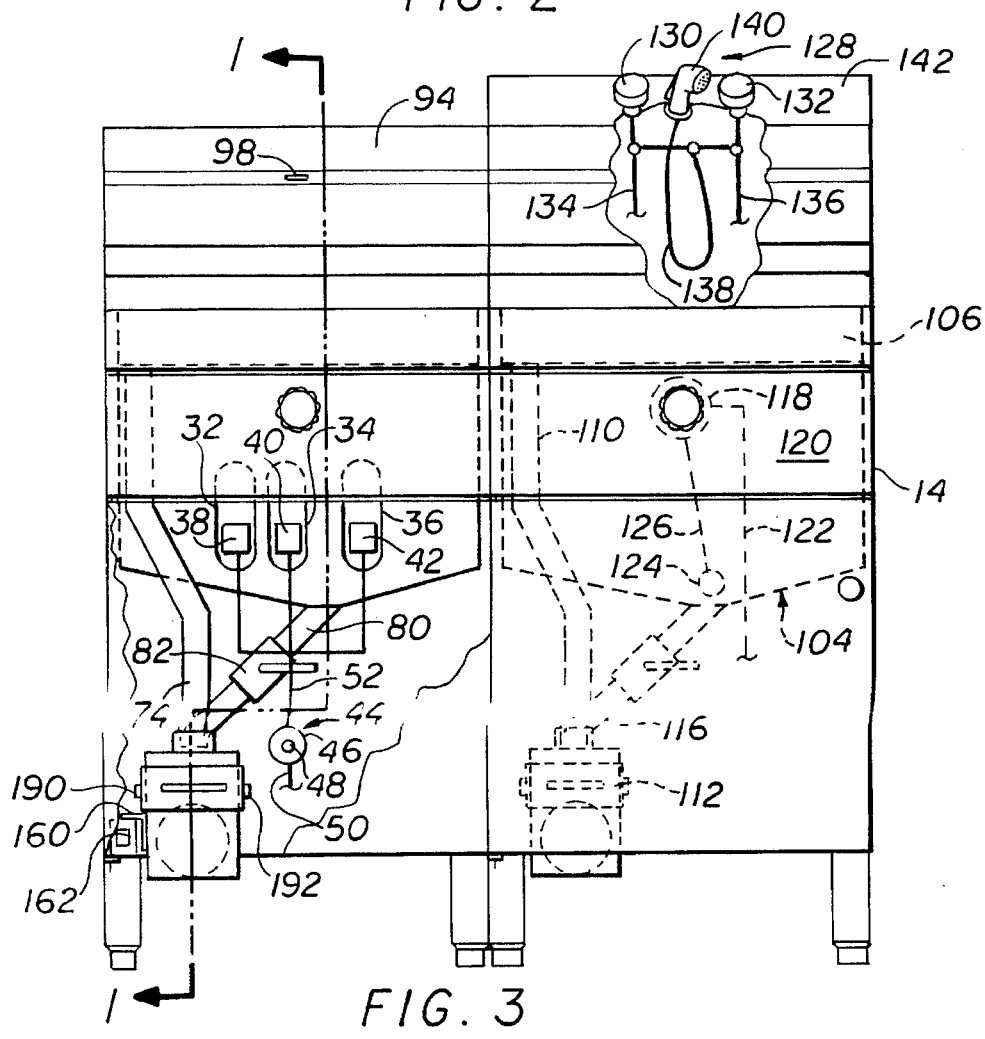
FIG. 3 is a front elevation of the pasta cooker shown in FIG. 1, with portions broken away to reveal interior structure.

In the preferred embodiment of the cooker 10, as best shown in FIGS. 2 and 3, a rinsing tank 104 is supported within the cabinet 14 adjacent to the tank 12. Rinsing tank 104 is substantially identical to tank 12 in construction; however, it lacks the tubes 32, 34, 36, and associated heating elements of the gas burner system 34. In the embodiment shown, the rinse tank 104 also includes a trough 106 having a drain opening 108 that is connected to a drain tube 110 that drains into a second screen box 112. Tank 104 also includes a drain opening 114 which is connected to a valved drain tube 116 that empties into screen box 112. Drain tubes 110, 116 and screen box 112 are substantially identical in construction and components to their counterparts associated to tank 12.

Cold water fill valve 118 is mounted on the front panel 120 of the cabinet 14 adjacent to tank 104, and is supplied by cold water supply line 122. Valve 118 is connected to a fill opening 124 in tank 104 by cold water fill line 126.

The support stand 94 adjacent to tank 104 includes a sprayer system, generally designated 128. Sprayer system 128 includes hot and cold water valves 130, 132, respectively, which in turn are connected to hot and cold water supply lines 134, 136. Valves 130, 132 are connected to a flexible sprayer hose 138 which terminates in a spray nozzle 140. The knobs of the valves 130, 132 and spray nozzle 140 are mounted on an inclined panel 142.

Figure 4:
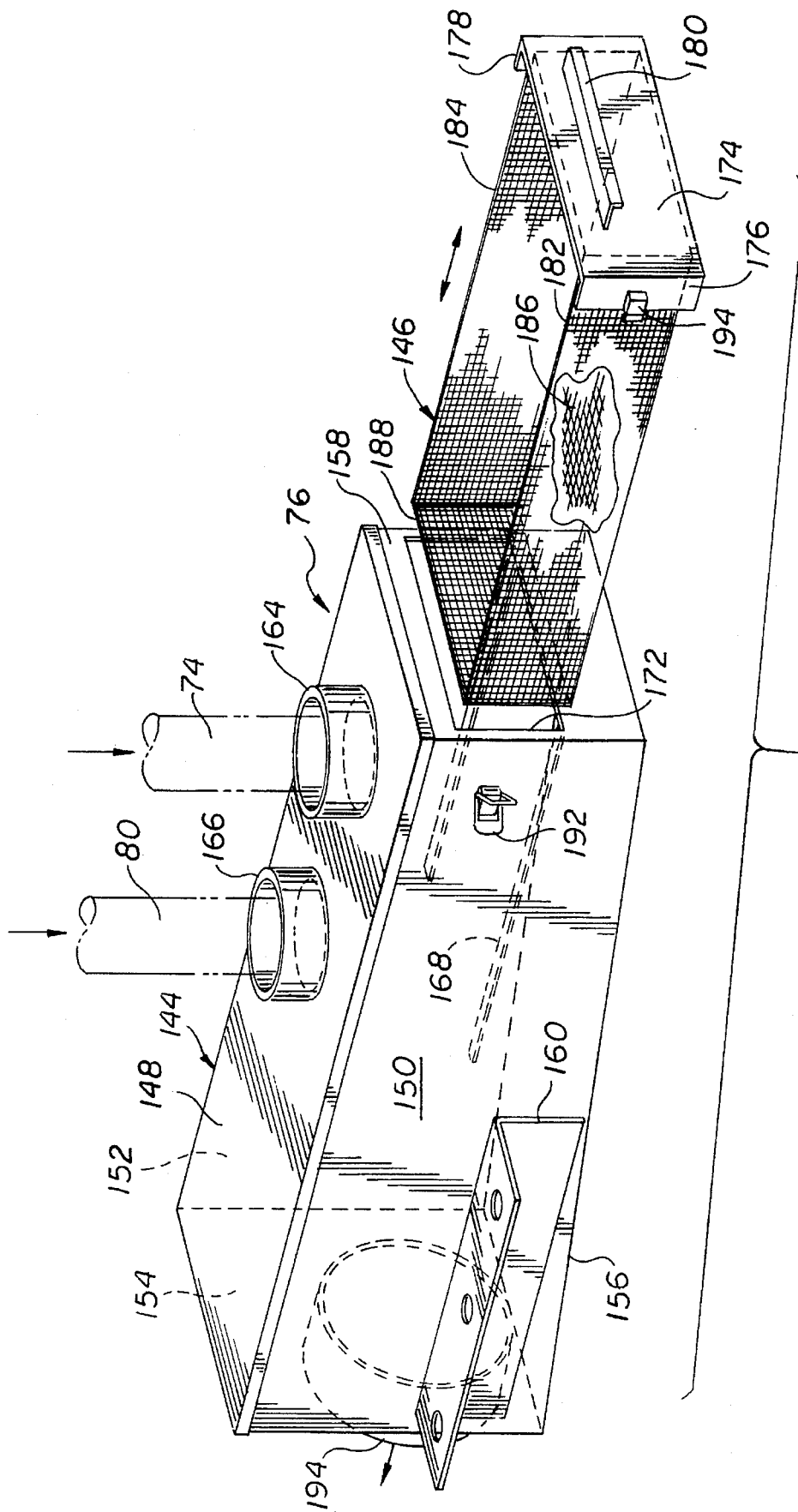
FIG. 4 is an exploded, perspective view of the screen box of the pasta cooker of FIG. 1.

As shown in FIG. 4, take screen box 76 (which is substantially identical in construction to screen box 112) includes a housing 144 and a removable drawer 146. The housing 144 includes a top wall 148, opposing side walls 150, 152, a rear wall 154, a bottom wall 156 which is inclined downwardly and rearwardly, and a front wall 158.

Side wall 150 includes an L-shaped channel 160 which is attached to a tubular channel 162 (see FIG. 3) that is integral with the cabinet 14. The top wall 148 includes nipples 164, 166 which receive the drain hose 74 from the trough 58 and the drain tube 80 from the tank 12. The connections are sufficiently more-to provide a vacuum break. Side walls 150, 152 include drawer slides 168, 170. Front wall 158 includes a rectangular opening 172 which is shaped to receive the drawer 146.

Drawer 146 includes an imperforate front face 174 which includes a pair of opposing side flanges 176, 178, and a handle 180. Drawer 146 also includes side walls 182, 184, a bottom wall 186, and rear wall 188. Walls 182–188 preferably are made of stainless steel which is perforated such that it is a minimum of 60% open.

The front face 174 and side flanges 176–178 are shaped such that the side flanges overlies the side walls 150, 152 of the housing 144 when the drawer is inserted therein. The side walls 150, 152 also include overcenter buckles 190, 192 (see FIG. 3) which engage lugs 194 carried on the side flanges 176, 178 (only one lug 194 being shown in FIG. 4, it being understood that flange 178 carries an identical lug). Overcenter buckles 190, 192 operate to positively mechanically secure the drawer 146 to the housing 144 during operation.

The drawer 146 is positioned directly beneath the nipples 164, 166 so that drain effluent from the trough 58 and tank 12 flows directly into the drawer 146 and the perforations 182–186 act to filter any particulates carried out of the drain water. The rear wall 154 includes a drain opening 194 which is connected to a conventional drain line 196 (see FIG. 1).

The operation of the pasta cooker 10 is as follows. Initially, the operator actuates fill valve 86 which permits hot water to flow through lines 88, 90 through the fill opening 92 to fill tank 12 with hot water. When tank 12 becomes sufficiently filled, the gas burner system 34 is actuated, and burners 38, 40, 42 are ignited to begin heating the water 194 (see FIG. 1) in tank 12. The control knob 48 is set for boil, and the water is heated. When the water 194 begins boiling, the basket 102, filled with uncooked—or partially cooked—pasta is placed in the tank 12 and rests upon the tubes 32, 34, 36 within the tank.

As the pasta cooks, the upper surface 196 of the water 194 begins to foam with starch. This starch foam begins washing from the tank 12 into trough 58, wherein it flows down bottom wall 60 to base wall 62. After a period of boiling, it is preferable to actuate the fill valve to provide a constant inflow of hot water through opening 92, which causes a small amount of water 194 to continually flow from tank 12 to trough 58. Since the starch foam floats on the upper surface 196 of the water 194, the starch foam is continually removed from the water in the tank. Once in the trough 58, the water and foam flows through the drain opening 64, drain tube 74, and into the screen box 76.

Once the water has flowed into screen box 76, it flows through the drawer 146 and the perforated walls 182–188 of the drawer filter out and retain the foam and any pasta particles entrained in the water. The remaining water flows through walls 182–188 and is conveyed rearwardly along the housing 144 by flowing downwardly and rearwardly inclined bottom wall 156 to the drain opening 194, at which time the drain water enters the conventional drain pipe and is conveyed to a sanitary sewer system.

Once the pasta in basket 102 has been sufficiently cooked, the basket 102 is lifted from tank 12 and may be suspended on channel 196, in the manner previously described to allow water to drain from it. The basket 102 is then placed in tank 104, which may be filled with cold water by means of valve 118 and water supply lines 122, 126. Alternately, or in addition, the pasta can be chilled by spraying it with water from spray nozzle 140, in which case the valves 130, 132 are adjusted so that the spray nozzle dispenses cold water.

After the cooking period has been completed, valve 82 is actuated to drain the tank 12 of water. The drain water travels through drain tube 80 and into screen box 76 through nipple 166. Drain water from tank 12 flows through the perforated walls 182–186 of drawer 146 and the particles of pasta, any other large contaminants, and any foam in such water is contained within drawer 146; the filtered water then flows along bottom wall 156 and out drain opening 194.

When the draining procedure for tank 12 has been completed, drawer 146 may be removed and cleaned, preferably by scraping material from the perforated walls 182–188 into a waste container. It is also preferable to perform such a drawer 146 cleaning procedure intermittently during the cooking procedure, in which case it is preferable to have at least two drawers 146 so that they may be alternated to provide continuous filtering of drain water.

Similarly, after the cooking procedure has been completed, tank 104 is drained by actuating the valve on drain line 116 and draining the cold water through screen box 112, where a filtering and draining process occurs which is substantially identical to that for screen box 76. Once both tanks 12, 104 have been drained, the tanks can be cleaned by spraying them with water from spray nozzle 140. The temperature of such cleaning water may be adjusted appropriately by valves 130, 132.

It is also within the scope of the present invention to provide an array or battery of tanks, each being constructed as either tank 12 or 104, to accommodate high-volume preparation of pasta. For example, it is within the scope of the invention to provide two tanks 12, positioned on either side of a tank 104, so that the single tank 104 could provide a draining and chilling function for pasta being cooked in each of the tanks 12. Such an arrangement is shown in phantom in FIG. 2 wherein a second tank 12' is positioned opposite tank 104 from tank 12.

While the forms of apparatus herein described constitute preferred embodiments of this invention, it is to be understood that the invention is not limited to these precise forms of apparatus, and that changes may be made therein without departing from the scope of the invention.

What is claimed is:

1. An apparatus for cooking pasta comprising:
   a tank for holding water, the tank including an upper portion and a lower portion;
   a heater for heating water in the tank;
   a trough along one side of the tank and communicating with the tank, the trough including a wall sloping downwardly from the tank upper portion to the tank lower portion and the trough being positioned to receive and collect starch foam generated by cooking pasta and water from an upper surface of water in the tank;
   a drain in communication with the trough lower portion for removing starch foam and water from the trough; and
   a screen in communication with the drain for receiving and capturing pasta starch entrained in water received by the trough;
   wherein starch foam generated by boiling of pasta in the tank is automatically and continually removed from the upper surface of the water in the tank during cooking of the pasta, and
   further comprising a means for filling the tank with water.

2. The apparatus of claim 1 wherein the trough wall has an upper edge which communicates with the tank and the means for filling includes means for continuously filling the tank with water such that the upper surface of the water in the tank is substantially coextensive with the upper edge of the trough whereby starch foam floating on the upper surface of the water continuously washes into the trough.

3. The apparatus of claim 2 further including a chamber housing the screen, the chamber being connected to the drain to receive starch foam and water from the trough.

4. The apparatus of claim 3 further comprising means interconnecting the chamber with the first drain.

5. The apparatus of claim 4 wherein the chamber is shaped to receive overflow from the screen in the event the screen becomes clogged with starch.

6. An apparatus for cooking pasta comprising:
   a tank for holding water, the tank including a lower portion;
   a heater for heating water in the tank;
   a trough communicating with the tank along one side of the tank, the trough having a lower portion and being positioned to receive and collect starch foam generated by boiling of pasta in the tank so that the starch foam is automatically and continually removed from an upper surface of the water in the tank;
   a first drain in communication with the trough lower portion for removing starch foam and water from the trough;
   a screen in communication with the drain for receiving and capturing pasta starch entrained in water received by the trough;
   a second drain in communication with the tank to direct water from the tank to the screen; and
   further comprising a means for filling the tank with water.

7. The apparatus of claim 6 further including a chamber housing the screen, the chamber being connected to the trough via the first drain to receive starch foam and water from the trough.

8. An apparatus for cooking pasta comprising:
   a tank for holding water, the tank including a lower portion;
   a heater for heating water in the tank;
   a trough communicating with the tank along one side of the tank, the trough being positioned to receive and collect starch foam generated by boiling of pasta in the tank so that the starch foam is automatically and continually removed from an upper surface of the water in the tank;
   a first drain in communication with the trough lower portion for removing starch foam and water from the trough;
   a screen in communication with the drain for receiving and capturing pasta starch entrained in water received by the trough;
   a second drain in communication with the tank to direct water from the tank to the screen;
   a chamber housing the screen, the chamber being connected to the trough by means of the first drain to receive starch foam and water from the trough; and
   further comprising means connecting the chamber with the second drain.

9. The apparatus of claim 8 wherein the chamber is shaped to substantially enclose the screen and the screen is shaped to be removable from the chamber.

10. The apparatus of claim 9 wherein the chamber includes a floor sloping downwardly and rearwardly relative to the screen.

11. The apparatus of claim 10 wherein the chamber is shaped to receive overflow from the screen in the event the screen becomes clogged with starch.

12. The apparatus of claim 11 further comprising a third drain positioned rearwardly of the screen.

13. The apparatus of claim 12 further comprising a second tank positioned adjacent the tank for holding water.

14. The apparatus of claim 13 further including a sprayer for spraying water on pasta in the second tank.

15. The apparatus of claim 14 wherein the sprayer includes a nozzle and a flexible hose connected to a source of water.

* * * * *